United States Patent
Sundman et al.

(10) Patent No.: US 11,690,027 B2
(45) Date of Patent: Jun. 27, 2023

(54) METHODS, APPARATUS AND DEVICE-READABLE MEDIUMS RELATING TO WIRELESS ACCESS IN A NETWORK REQUIRING A CARRIER-SENSE MECHANISM

(71) Applicant: Telefonaktiebolaget LM Ericsson (publ), Stockholm (SE)

(72) Inventors: Dennis Sundman, Sollentuna (SE); Mehmet Burak Guldogan, Stockholm (SE); Miguel Lopez, Solna (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/287,285

(22) PCT Filed: Oct. 24, 2018

(86) PCT No.: PCT/EP2018/079183
§ 371 (c)(1),
(2) Date: Apr. 21, 2021

(87) PCT Pub. No.: WO2020/083484
PCT Pub. Date: Apr. 30, 2020

(65) Prior Publication Data
US 2021/0377878 A1    Dec. 2, 2021

(51) Int. Cl.
*H04W 74/08* (2009.01)
*H04W 52/42* (2009.01)
*H04W 52/28* (2009.01)

(52) U.S. Cl.
CPC ........ *H04W 52/42* (2013.01); *H04W 52/285* (2013.01); *H04W 74/0808* (2013.01)

(58) Field of Classification Search
CPC ................................................. H04W 74/0808
See application file for complete search history.

(56) References Cited

U.S. PATENT DOCUMENTS

2018/0115996 A1    4/2018   Si et al.

FOREIGN PATENT DOCUMENTS

| JP | 2017528035 A  | 9/2017 |
| WO | 2014071308 A1 | 5/2014 |
| WO | 2018044353 A2 | 3/2018 |

OTHER PUBLICATIONS

Huawei, et al., "Coexistence and channel access for NR unlicensed band operations", 3GPP TSG RAN WG1 Meeting #94bis, R1-1810126, Chengdu. China, Oct. 9-12, 2018, 1-13.

(Continued)

*Primary Examiner* — James P Duffy
(74) *Attorney, Agent, or Firm* — Murphy, Bilak & Homiller, PLLC

(57) ABSTRACT

Methods, apparatus and device-readable mediums are disclosed relating to wireless access in a network requiring a carrier-sense mechanism. One aspect provides a method performed by a transmitting device for transmitting to a receiving device in a 10 wireless communications network. The transmitting device comprises a plurality of antenna elements. The method comprises: performing a directional carrier-sense assessment for one or more sub-bands configured for transmissions between the transmitting device and the receiving device, the directional carrier-sense assessment utilizing beamforming to detect a respective level of wireless activity on each of the sub-15 bands in a particular direction for transmissions to the receiving device; selecting a respective transmit power for each sub-band based on the determined level of wireless activity; and transmitting to the (Continued)

receiving device in the particular direction, using the respective selected transmit power for each sub-band.

19 Claims, 4 Drawing Sheets

(56) References Cited

OTHER PUBLICATIONS

Marks, Roger, et al., "Reconsidering Implicit Feedback for Beamforming", IEEE 802.11-18/0509r1, Mar. 8, 2018, 1-18.
Perahia, Eldad, et al., "Next Generation Wireless LANs Throughput, Robustness, and Reliability in 802.11n", Cambridge University Press 2008, www.cambridge.org/9780521885843, 2008, 1-417.
Rom, Raphael, et al., "Multiple Access Protocols: Performance and analysis", Springer-Veriag New York, NY, 1990, 1-177.
ZTE, et al., "Framework on potential solutions and techniques for NR-U", 3GPP TSG RAN WG1 Meeting #92, R1-1801466, Athens, Greece, Feb. 26-Mar. 2, 2018, 1-8.
"Discussion on the channel access procedures", 3GPP TSG RAN WG1 Meeting #94, R1-1808237, Gothenburg, Sweden, Aug. 20-24, 2018, 6 pages.

METHODS, APPARATUS AND DEVICE-READABLE MEDIUMS RELATING TO WIRELESS ACCESS IN A NETWORK REQUIRING A CARRIER-SENSE MECHANISM

TECHNICAL FIELD

Embodiments of the present disclosure relate to wireless communication networks, and particularly to methods, apparatus and device-readable mediums relating to wireless access in a wireless network requiring a carrier-sense mechanism.

BACKGROUND

Certain wireless communication networks require a carrier-sense mechanism to avoid or reduce interference between wireless devices utilizing similar spectrum. This is particularly the case with radio-access technologies using unlicensed spectrum, such as Wi-Fi. The carrier-sense mechanism usually involves a transmitting device sensing the wireless medium for a period of time prior to transmitting over that medium. If the medium is determined to be busy (e.g., another device is transmitting in the vicinity of the transmitting device), the transmission may be deferred; if the medium is determined to be idle, the transmission can take place.

The carrier sensing mechanism in 802.11 Wi-Fi is called 1-persistent slotted carrier sense multiple access with random backoff time and with collision avoidance (CSMA/CA). This technique is well known in the art. Further detail on 1-persistent slotted carrier sense multiple access can be found in a book by Rom and Sidi ("Multiple Access Protocols: Performance and Analysis", Springer-Verlag, 2012). Further detail on random backoff and collision avoidance can be found in a book by Perahia and Stacey ("Next Generation Wireless LANs", Cambridge University Press, 2013). In 802.11, CSMA/CA is performed through two main carrier sense mechanisms: energy detect clear-channel assessment (CCA) and signal detect CCA.

For energy detect CCA, it is specified that if a wireless device (STA) detects signal power on the primary channel on any antenna, where the signal power is larger than a power threshold of $P_e = -62$ dBm, under a sensing time of smaller than or equal to $T_e = 4$ µs, it shall defer from transmitting.

For signal detect CCA, it is specified that if a STA detects an orthogonal frequency division multiplex (OFDM) signal on the primary channel on any antenna with a power threshold of $P_s = -82$ dBm under a sensing time of $T_s = 4$ µs, the STA shall defer from transmitting. Signal-detect CCA may be achieved for example by detecting a signal using the short training field (STF) part of the transmitted signal, and by determining whether the power is stronger than or equal to the power threshold $P_s = -82$ dBm. Note that the power threshold for signal-detect CCA is different (lower) than the power threshold for energy-detect CCA.

For secondary channels, different power thresholds are possible. Furthermore, with the introduction of high efficiency (HE) in 802.11ax, color bits and other mechanisms allow for various different power thresholds.

Wireless communication increasingly relies on beamforming techniques to increase signal gain at a receiver and to reduce interference between transmissions. To perform beamforming, the channel from the transmitter to the receiver is typically known at the transmitter. One way to obtain this knowledge is through channel sounding. Once the channel is known, it is fed back from the receiver to the transmitter for accurate beamforming. Beamforming in Wi-Fi is explained in more detail in the book by Perahia and Stacey. With the introduction of 802.11ay, pre-defined beams were introduced, meaning that less time needs to be spent on training, at the cost of reduced beamforming gain.

Thus significant gains can be made through the use of beamforming techniques. One problem, however, is that a transmitting device is still required to perform a clear channel assessment prior to transmitting. Existing CCA mechanisms are omni-directional, and do not take into account the benefits of beamforming. A transmitting device may be able to use beamforming to transmit to a target receiving device without causing interference to other devices which are transmitting nearby. However, a traditional CCA is likely to fail due to the presence of those devices; thus the transmitting device would defer transmission, and back-off. The available radio resources are inefficiently utilized, and the transmitting device is subject to unnecessary delays.

SUMMARY

Embodiments of the present disclosure seek to address these and other problems.

Methods, apparatus and device-readable mediums are disclosed relating to wireless access in a network requiring a carrier-sense mechanism. One aspect provides a method performed by a transmitting device for transmitting to a receiving device in a wireless communications network. The transmitting device comprises a plurality of antenna elements. The method comprises: performing a directional carrier-sense assessment for one or more sub-bands configured for transmissions between the transmitting device and the receiving device, the directional carrier-sense assessment utilizing beamforming to detect a respective level of wireless activity on each of the sub-bands in a particular direction for transmissions to the receiving device; selecting a respective transmit power for each sub-band based on the determined level of wireless activity; and transmitting to the receiving device in the particular direction, using the respective selected transmit power for each sub-band.

Apparatus and non-transitory device-readable mediums comprising instructions for performing the method set out above are also disclosed. For example, in another aspect, there is provided a transmitting device comprising processing circuitry and a plurality of antenna elements. The processing circuitry is configured to: perform a directional carrier-sense assessment for one or more sub-bands configured for transmissions between the transmitting device and the receiving device, the directional carrier-sense assessment utilizing beamforming to detect a respective level of wireless activity on each of the sub-bands in a particular direction for transmissions to the receiving device; select a respective transmit power for each sub-band based on the determined level of wireless activity; and transmit to the receiving device in the particular direction, using the respective selected transmit power for each sub-band.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
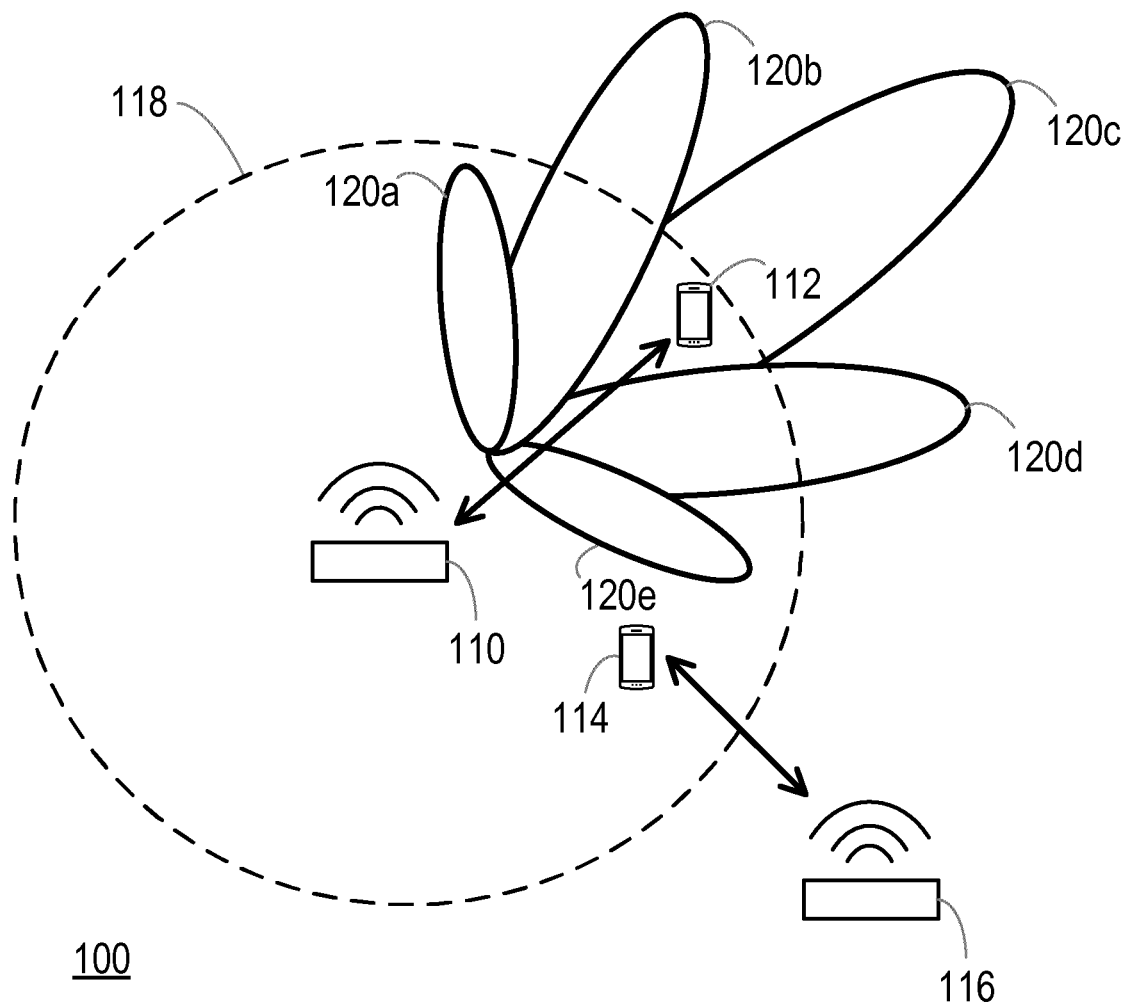
FIG. 1 shows a wireless communication network according to embodiments of the disclosure.

FIG. 1 shows a wireless communication network 100 according to embodiments of the disclosure. The network 100 comprises a first access point 110, a target wireless device 112, an interfering wireless device 114 and a second access point 116. The access points 110, 116 and wireless devices 112, 114 transmit to each other using a radio-access technology that requires performance of a carrier-sense assessment (e.g., a CCA) prior to each transmission. For example, the radio-access technology may utilize unlicensed spectrum, which is shared between multiple radio-access technologies. In one embodiment, the network 100 implements one or more IEEE 802.11 standards (known as "Wi-Fi") and comprises a wireless local area network (WLAN). For convenience, the terminology used herein may correspond to that used in the 802.11 standards (e.g., "access point", "STA"). However, the concepts described herein may also find use in other radio-access technologies.

The scenario depicted in FIG. 1 is as follows. The target wireless device 112 belongs to a basic service set (BSS) associated with the first access point 110. The interfering wireless device 114 belongs to a BSS associated with the second access point 116. The first access point 110 has data to transmit to the target wireless device 112, and is therefore required to perform a carrier-sense assessment prior to transmitting. The interfering wireless device 114 is transmitting to the second access point 116 at the same time, and using the same wireless spectrum (e.g., the same channel) as that configured for transmissions between the first access point 110 and the target wireless device 112.

The first access point 110 may therefore perform a carrier-sense assessment to determine if the channel is free or busy. A traditional carrier-sense assessment is omni-directional (i.e. equally sensitive in all directions), and illustrated by the dashed circle 118 in FIG. 1. The interfering wireless device 114 is within the dashed circle 118, illustrative of the transmissions by the interfering wireless device 114 exceeding a power threshold associated with the omni-directional carrier-sense assessment. Thus, in ordinary circumstances, the first access point 110 would defer transmission until a later time (when a further carrier-sense assessment is performed).

The first access point 110 comprises a plurality of antennas or antenna elements, and is therefore capable of using beamforming techniques to focus its transmissions into one or more beams. As will be understood by those skilled in the art, beamforming involves the application of a set of weights and/or phase shifts to signals provided to or received from each antenna or antenna element such that those signals are weighted and/or phase-shifted by respective amounts. By applying a set of weights and/or phase shifts to signals provided to the antennas for transmission, a transmission beam is formed; by applying a set of weights and/or phase shifts to signals received by the antennas, a reception beam is formed (i.e. the reception is more sensitive in one direction than other directions). The beams may be pre-defined (e.g., in a standard implemented by the first access point 110, such as IEEE 802.11ay), or determined based on feedback from earlier transmissions by the receiving wireless device.

In particular, the first access point 110 is able to utilize one or more beams 120 to transmit to the target wireless device 112. In the illustrated embodiment, five different beams are shown: a main beam 120c, pointed directly towards the target wireless device 112; and four side beams (or side lobes) 120a, 120b, 120d and 120e. In this context, it will be understood by those skilled in the art that a beam need not necessarily be transmitted along a vector path directly towards a receiving device to provide effective transmission to that receiving device. A beam may be subjected to one or multiple reflections and attenuations from surfaces and objects in the vicinity of the transmitting device and the receiving device. This is particularly so where the beam is transmitted indoors, as is often the case for WLANs. Thus a side beam (e.g. 120a) may provide a transmission mechanism which is as or more effective than a main beam 120c.

Further, it will be understood by those skilled in the art that each beam may correspond to a particular transmission frequency (or subcarrier). For example, a set of weights and/or phase-shifts applied to signals for transmission by the plurality of antennas will generally produce multiple beams, including a main transmission beam at a first transmission frequency, and one or more secondary transmission beams (or side beams) at one or more second transmission frequencies.

In order to utilize available radio resources more efficiently, and to decrease the likelihood of deferring transmission owing to negative carrier-sense assessments, according to embodiments of the disclosure a transmitting device is configured to perform a directional carrier-sense assessment to detect a level of wireless activity in a particular direction, prior to transmitting to a receiving device in the particular direction. The transmitting device selects or determines a transmit power based on the detected level of wireless activity, and uses the transmit power in its subsequent transmission to the receiving device.

By performing a carrier-sense assessment in a particular direction, the transmitting device is able to determine whether a subsequent transmission in that direction is likely to cause interference to (i.e. to collide with) transmissions by other devices only in that direction. Transmissions by devices in other directions will not be adversely effected by a subsequent transmission using beamforming, and therefore those transmissions need not be taken into account when performing the carrier-sense assessment.

Further, embodiments of the disclosure divide the configured wireless spectrum (e.g., a channel configured for transmissions by the transmitting device) into one or more sub-bands, and determine the level of wireless activity in each sub-band. Respective transmit powers are selected for each sub-band, based on the level of activity detected in the directional carrier-sense assessment, and used in a subsequent transmission to the receiving device. For example, a relatively low or zero transmit power may be selected for a sub-band with a relatively high level of wireless activity (e.g., busy); a relatively high transmit power may be selected for a sub-band with a relatively low level of wireless activity (e.g., idle). Thus, not only is the direction of any transmission taken into account, but also the particular frequencies at which the transmission occurs.

Further detail regarding embodiments of the disclosure can be found below, in the description of FIG. 2.

Figure 2:
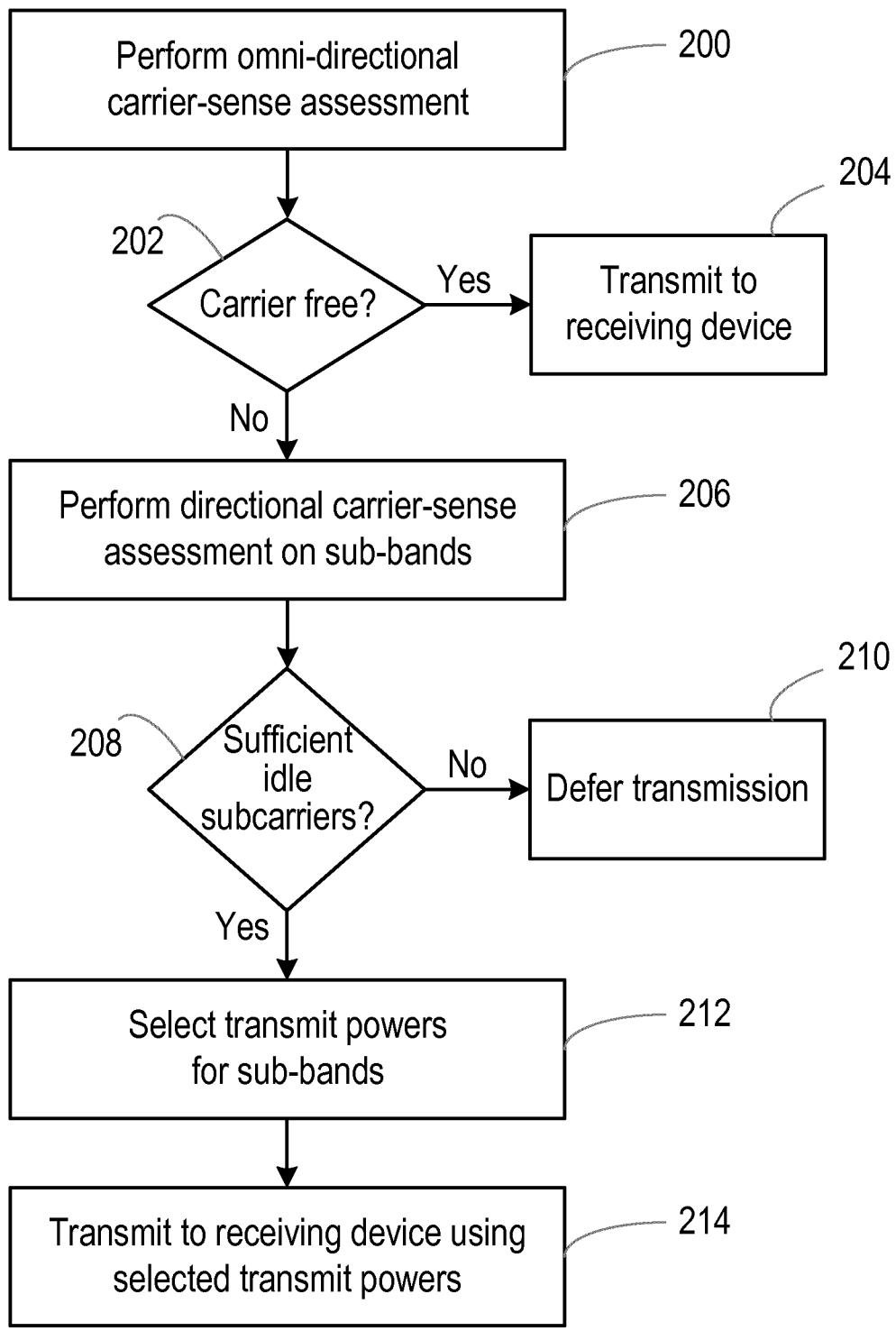
FIG. 2 is a flowchart of a method in a transmitting device according to embodiments of the disclosure.

FIG. 2 is a flowchart of a method in a transmitting device according to embodiments of the disclosure. The transmitting device may be suitable device, such as an access point or a mobile device (STA). For example, the transmitting device may be the first access point 110 described above with respect to FIG. 1. The transmitting device is configured with one or more channels over which wireless transmissions can take place with one or more receiving devices. The channel may correspond to a particular transmission frequency, or in practice a range of frequency centered around a particular transmission frequency.

Embodiments of the disclosure also refer to a "sub-band", which is a sub-division of the full bandwidth configured for transmissions by the transmitting device. In embodiments which utilize orthogonal frequency division multiplexing, a sub-band may correspond to one or more subcarriers.

The full frequency band, BW, under consideration may be divided into/sub-bands (where/is an integer equal to or greater than one). The full bandwidth BW may comprise one or more channels, within one or more different transmission bands. Therefore, the sub-bands may also be non-adjacent in the frequency domain. For example, one sub-band may reside in the 2.4 GHz ISM band, while another sub-band resides in the 5 GHz band, and/or the 6 GHz band.

The bandwidth of each sub-band may be the same or different. For example, in the former case, the bandwidth s of each sub-band may correspond to one subcarrier i.e., $$S = \frac{BW}{N\_FFT},$$

where N_FFT is the fast Fourier transform length. Alternatively, the bandwidth of the (single) sub-band may correspond to the entire bandwidth BW. For the general case (applying to OFDM transmissions), the bandwidth s of each sub-band comprises K subcarriers (where K is an integer equal to or greater than one). The subcarriers may be adjacent in the frequency domain or not.

The method shown in FIG. 2 further assumes that the wireless channel between the transmitting device and the receiving device is known and calibrated. That is, the antenna weights and/or phase shifts to be applied for beamforming transmissions between the transmitting device and the receiving device are known. For example, the transmitting device may have previously communicated with the receiving device and determined the appropriate beamforming parameters to be used for transmissions to the receiving device. In this regard, it may be assumed that the transmitting device and the receiving device are sufficiently static that the beamforming parameters from a previous communication will apply to a current situation.

The method begins upon the transmitting device determining that data is available for transmission to the receiving device. In step 200, the transmitting device optionally performs an omni-directional carrier-sense assessment, i.e. as known in the prior art and discussed above in the background section.

The omni-directional carrier-sense assessment detects the level of wireless (i.e., radio) activity over the entire bandwidth BW configured for transmissions by the transmitting device. For example, the bandwidth BW may correspond to one or more channels. The carrier-sense assessment in step 200 is omni-directional in the sense that it is equally sensitive in all directions and does not, for example, apply beamforming techniques to increase the sensitivity in a particular direction above that in other directions.

The omni-directional carrier-sense assessment may comprise a clear-channel assessment (CCA), and may utilize energy-detect or signal-detect mechanisms to determine the channel as busy or idle. In either case, the detected power is compared to a power threshold: $P_e$ for energy detect; and a for signal detect. In signal detect, the transmitting device is synchronized with the interfering device and triggers the signal detect carrier-sense assessment upon detection of a short training field (STF) in a transmitted WiFi packet.

In step 202, the transmitting device determines whether the channel (or carrier) is free or not, based on the detected power. If the channel is free, the method proceeds to step 204, and the transmitting device transmits to the receiving device following conventional methods.

If the channel is not free, however, the method proceeds to step 206 in which the transmitting device performs a directional carrier-sense assessment over each of the I sub-bands. That is, the transmitting device applies a set of weights and/or phase-shifts to signals for each of its plurality of antennas or antenna elements, so as to increase the sensitivity of reception in a direction which is suitable for transmissions to the receiving device. As will be understood from the description above with respect to FIG. 1, the direction need not correspond precisely to the line-of-sight between the transmitting device and the receiving device, but may instead account for reflections and attenuations on the path between the transmitting device and the receiving device. Further, each subcarrier may correspond to a slightly different direction.

Figure 3:
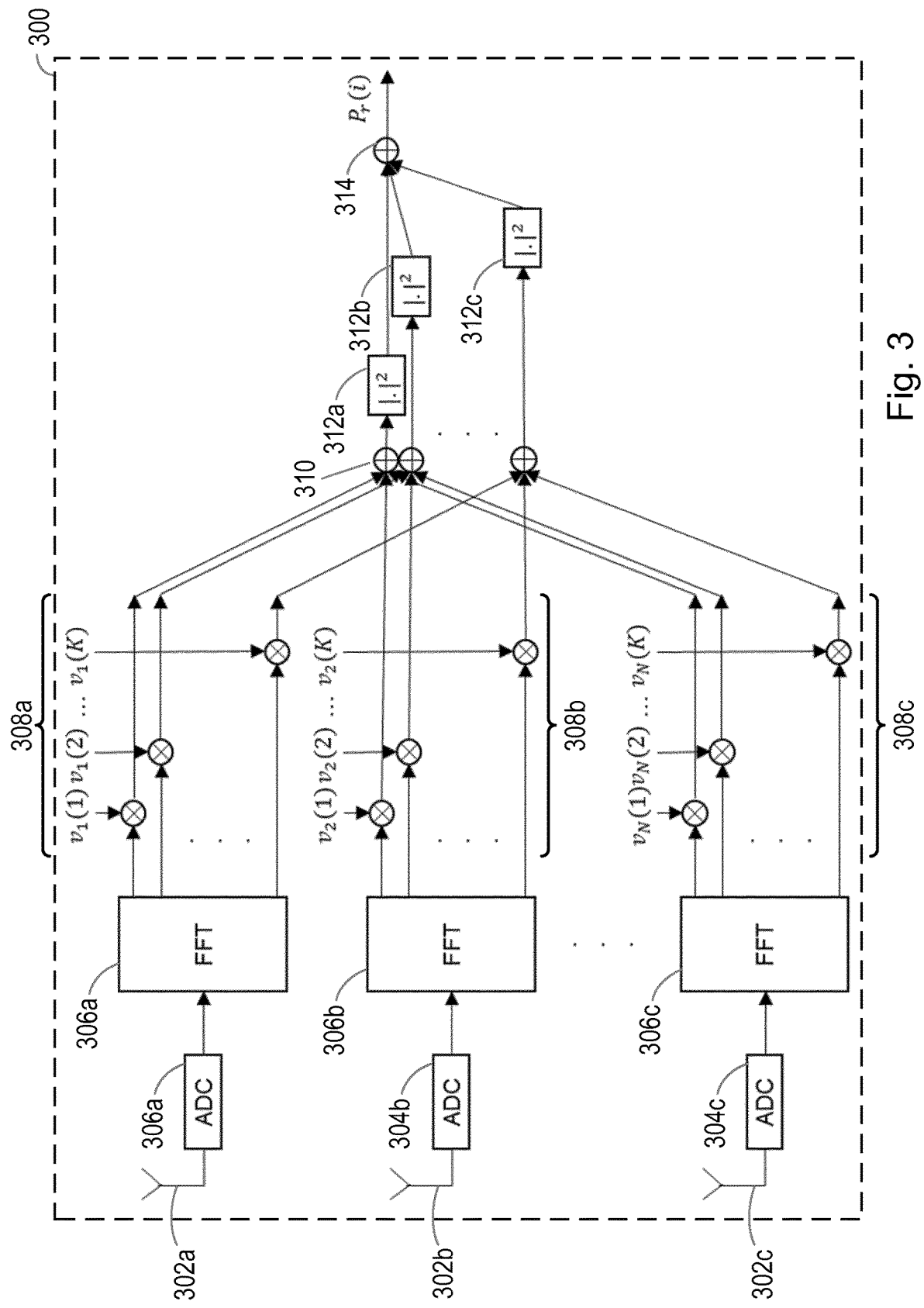
FIG. 3 is a schematic diagram of a directional carrier sense mechanism according to embodiments of the disclosure.

FIG. 3 is a schematic diagram of a directional carrier sense mechanism 300 according to embodiments of the disclosure, which may be implemented in the transmitting device. The carrier-sense mechanism 300 is shown acting on a single sub-band.

As noted above, the transmitting device comprises a plurality of antennas 302, of which three are shown in FIG. 3 (referenced as 302a, 302b and 302c respectively). Any number of antennas greater than two is contemplated by the present disclosure. The number of antennas is denoted N. The received signal from each antenna 302 is converted to the digital domain by respective analogue-to-digital converters 304a, 304b, 304c, before being passed to respective fast Fourier transform (FFT) modules 306a, 306b, 306c. The FFT modules 306 divide each signal into its frequency components. In the illustrated example, where a sub-band corresponds to K subcarriers, each FFT module 306 outputs K signals corresponding to the different subcarriers.

Each frequency component is provided to a respective multiplying element, where it is multiplied by a respective beamforming weight. Thus, the $k^{th}$ frequency component from the $n^{th}$ antenna is multiplied by a weight $v_n(k)$. The frequency components output from the FFT module 306a are provided to a set of multiplying elements 308a; the frequency components output from the FFT module 306b are provided to a set of multiplying elements 308b; and the frequency components output from the FFT module 306c are provided to a set of multiplying elements 308c.

The weighted frequency component outputs for each antenna are provided to respective summing elements 310, such that the weighted outputs from all antennas for a particular frequency component are summed together. Thus, there are K summing elements 310. The power in each frequency component is determined by squaring the summed outputs in respective squaring elements 312a, 312b, 312c, and the overall detected power $P_r(i)$ for the $i^{th}$ sub-band is determined by summing the power outputs in a further summing element 314.

In order to compare the detected received power $P_r(i)$ for the $i^{th}$ sub-band to a power threshold, one or more compensating factors may be applied. For example, a first compensation factor $P_{cs}$ may be applied to compensate for the fact that the detected received power is for a sub-band rather than the whole bandwidth BW. The first compensation power may for example be $$P_{cs}(i) = 10\log_{10}\frac{S}{BW}$$

(where S is the bandwidth of the $i^{th}$ sub-band, as noted above). Using our previous examples, if S=BW, $P_{cs}(i)$=0, and if $$S = \frac{BW}{N\_FFT}, P_{cs}(i) = -10\log_{10}N\_FFT.$$

Thus it will be seen that the first compensation factor is equal to zero if the sub-band comprises the entire bandwidth.

A second compensation factor $P_c$ may be optionally applied to compensate for the antenna gain. For example, $P_c$ may be set as the antenna gain in embodiment. As an example, the antenna gain may be constant such that $P_c$=10 $\log_{10}$ N [dB], where N is the number of antennas. Another way of measuring the amount of power in the direction of the maximal gain is through the equivalent isotropic radiated power (EIRP). Thus another choice of $P_c$ is to set it as the EIRP. In yet a further example, the second compensation factor may be ignored entirely.

After compensation by the first and/or second compensation factors, the detected received power can be compared to the threshold values ($P_e$ for energy detect; $P_s$ for signal detect). Thus the compensated power $P_r(i)-P_{cs}(i)-P_c$ may be compared with the energy detect threshold $P_e$ or the signal detect threshold $P_s$. In the latter case, the signal detect mechanism may be altered compared to the omni-directional carrier-sense assessment, by waiting for an offset after detection of the short training field before measuring the power. That is, the omni-directional signal detect CCA is triggered upon detection of a short training field (where each WiFi packet comprises two STFs at the start, each 4 µs long). As the directional carrier-sense assessment is concerned only with active subcarriers, the power may be measured after the STFs have finished (e.g., during transmission of the long training fields, LTFs). For example, the directional sub-band carrier-sense assessment may be performed after 12 µs from the start of each packet, rather than 4 µs after the start of the packet as with omni-directional signal detect CCA.

Thus in one embodiment the output of step 206 is a binary determination for each of the one or more sub-bands as to whether the sub-band is idle (i.e., received power below the threshold) or busy (i.e., received power above the threshold). If a sub-band is determined to be idle, all of the subcarriers belonging to that sub-band are determined to be idle; if a sub-band is determined to be busy, all of the subcarriers belonging to that sub-band are determined to be busy.

In step 208, it is determined whether there are sufficient idle subcarriers to reliably transmit to the receiving device (e.g., such that the receiving device has a good chance to receive and decode the transmission). For example, the number of idle subcarriers may be compared to a threshold number of subcarriers. In one embodiment, the threshold number of subcarriers is determined based on the total number of subcarriers across the bandwidth BW and the coding rate. For example, the total number of subcarriers may be multiplied by the coding rate to give the threshold number, such that if there are 52 subcarriers and the coding rate is 0.5, the threshold number is 26. Alternative formulations are of course possible, and the present disclosure is not limited in that respect.

If there are insufficient idle subcarriers, the method proceeds to step 210 and, in the illustrated embodiment, the transmitting device defers from transmitting to the receiving device. For example, the transmitting device may back-off for a time before reattempting the carrier-sense assessment. Alternatively, the transmitting device may repeat the directional carrier-sense assessment, but using a different configuration of sub-bands, e.g., a different number of sub-bands, or differently arranged sub-bands. In one particular example, the transmitting device may repeat the directional carrier-sense assessment using a higher number of sub-bands, such that the total bandwidth is analyzed with higher granularity.

If there are sufficient idle subcarriers, the method proceeds to step 212, in which the transmitting device selects transmit powers for each of the one or more sub-bands. Where the carrier-sense assessment is binary for each sub-band (i.e., idle or busy), the selection of transmit powers may comprise selecting a zero transmit power for busy sub-bands such that those sub-bands are punctured or muted; the transmit powers for idle sub-bands may be selected to be "full" or conventional, i.e. whatever transmit power is conventionally selected for transmitting to the receiving device. It will here be noted that various adaptive power control mechanisms may be utilized by the transmitting device (e.g., those as defined in 802.11ax), and the transmit power control described here may act in combination with such mechanisms.

In step 214, the transmitting device transmits its data to the receiving device using the transmit powers selected in step 212.

The description above has focused on an embodiment in which a binary determination is made as to whether a sub-band is busy or idle. In practice, however, different sub-bands may experience different degrees of interference. In an alternative embodiment, instead of comparing the received power for each sub-band to a single threshold in step 206 and proceeding to step 208, the received power for each sub-band in step 206 is used to select a transmit power for that sub-band, i.e., the method proceeds directly from step 206 to step 212.

In such an embodiment, the transmit power may be chosen as a function of the received power for a sub-band. The function may describe an inverse relationship between the received power for each sub-band and the transmit power for that sub-band, such that a relatively high received power in a sub-band results in a relatively low transmit power being selected; conversely, a relatively low received power in a sub-band results in a relatively high transmit power for that sub-band. The transmit power may be determined mathematically, based on the received power for each sub-band. Alternatively, a look-up table may be utilized, linking a plurality of ranges of received power to respective transmit power values. Thus the transmitting device may measure the received power for a sub-band and select the corresponding transmit power from the look-up table. Again, the present disclosure is not limited in that respect.

Thus embodiments of the disclosure provide methods in which spatial and frequency resources are re-used, making the usage of transmission resources more efficient and reducing the likelihood that a transmitting device will be subject to delays through carrier-sense failures.

Figure 4:
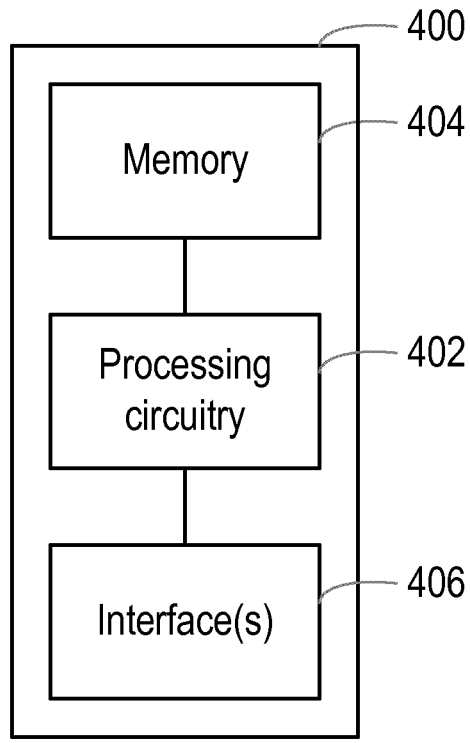
FIG. 4 is a schematic diagram of a transmitting device according to embodiments of the disclosure.

FIG. 4 is a schematic diagram of a transmitting device 400 according to embodiments of the disclosure. The transmitting device 400 is operative to communicate in a wireless communications network requiring a carrier-sense mechanism, such a wireless local area network compliant with IEEE 802.11 specifications. The transmitting device 400 may be a wireless device such as a mobile station or user equipment, or a network node such as an access point or a base station.

The transmitting device 400 comprises processing circuitry 402, a non-transitory device-readable medium (such as memory) 404 and one or more interfaces 406. The processing circuitry 402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other components, such as device readable medium 404, the transmitting device 400 with functionality. For example, processing circuitry 402 may execute instructions stored in device readable medium 404 or in memory within processing circuitry 402. In some embodiments, processing circuitry 402 may include a system on a chip (SOC). In some embodiments, processing circuitry 402 may include radio frequency (RF) transceiver circuitry and baseband processing circuitry.

In certain embodiments, some or all of the functionality described herein as being provided by a transmitting device may be performed by processing circuitry 402 executing instructions stored on device readable medium 404 or memory within processing circuitry 402. alternative embodiments, some or all of the functionality may be provided by processing circuitry 402 without executing instructions stored on a separate or discrete device readable medium, such as in a hard-wired manner. In any of those embodiments, whether executing instructions stored on a device readable storage medium or not, processing circuitry 402 can be configured to perform the described functionality. For example, the processing circuitry 402 may be configured to perform the method described above with respect to FIG. 2. The benefits provided by such functionality are not limited to processing circuitry 402 alone or to other components of the transmitting device 400, but are enjoyed by the transmitting device 400 as a whole, and/or by end users and the wireless network generally.

Device readable medium 404 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 402. Device readable medium 404 may store any suitable instructions, data or information, including a computer program, software, an application including one or more of logic, rules, code, tables, etc. and/or other instructions capable of being executed by processing circuitry 402 and, utilized by the transmitting device 400. Device readable medium 404 may be used to store any calculations made by processing circuitry 402 and/or any data received via interface 406. In some embodiments, processing circuitry 402 and device readable medium 404 may be considered to be integrated.

Interface(s) 406 are used in the wireless communication of signalling and/or data between the transmitting device 400 and a receiving device. Interface(s) 406 may include radio front end circuitry that may be coupled to, or in certain embodiments a part of, a plurality of antenna elements. The radio front end circuitry may be configured to condition signals communicated between the antenna elements and processing circuitry 402. The radio front end circuitry may receive digital data that is to be sent to a receiving device via a wireless connection. The radio front end circuitry may convert the digital data into a radio signal having the appropriate channel and bandwidth parameters using a combination of filters and/or amplifiers. The radio signal may then be transmitted via the antenna elements. Similarly, when receiving data, the antenna elements may collect radio signals which are then converted into digital data by the radio front end circuitry. The digital data may be passed to processing circuitry 402. In other embodiments, the interface may comprise different components and/or different combinations of components.

According to embodiments of the disclosure, the processing circuitry 402 is configured to perform a directional carrier-sense assessment for one or more sub-bands configured for transmissions between the transmitting device 400 and a receiving device. The directional carrier-sense assessment utilizes beamforming to detect a respective level of wireless activity on each of the sub-bands in a particular direction for transmissions to the receiving device. The processing circuitry 402 is further configured to select a respective transmit power for each sub-band based on the determined level of wireless activity, and to initiate a transmission to the receiving device in the particular direction, using the respective selected transmit power for each sub-band.

Figure 5:
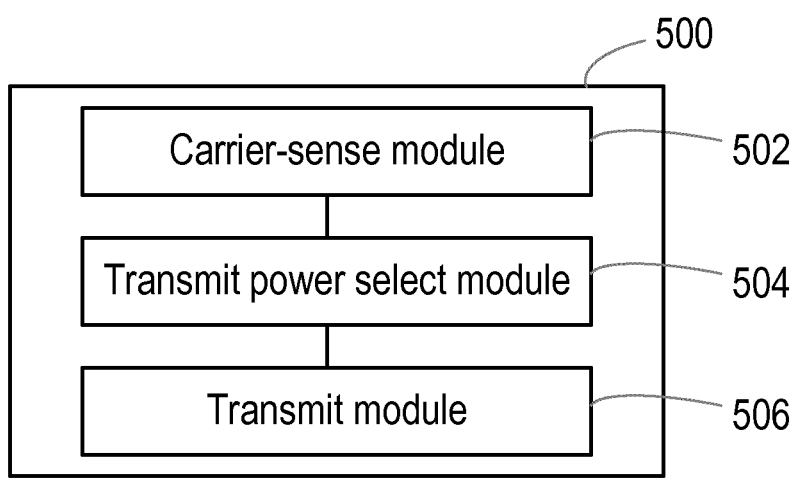
FIG. 5 is a schematic diagram of a transmitting device according to further embodiments of the disclosure.

FIG. 5 is a schematic diagram of a transmitting device 500 according to further embodiments of the disclosure. The transmitting device 500 is operative to communicate in a wireless communications network requiring a carrier-sense mechanism, such a wireless local area network compliant with IEEE 802.11 specifications. The transmitting device 500 may be a wireless device such as a mobile station or user equipment, or a network node such as an access point or a base station. The transmitting device 500 may be configured to implement or perform the method described above with respect to FIG. 2.

The transmitting device 500 comprises a carrier-sense module 502, a transmit-power select module 504 and a transmit module 506. According to embodiments of the disclosure, the carrier-sense module 502 is configured to perform a directional carrier-sense assessment for one or more sub-bands configured for transmissions between the transmitting device 500 and a receiving device. The directional carrier-sense assessment utilizes beamforming to detect a respective level of wireless activity on each of the sub-bands in a particular direction for transmissions to the receiving device. The transmit-power select module 504 is configured to select a respective transmit power for each sub-band based on the determined level of wireless activity. The transmit module 506 is configured to initiate a transmission to the receiving device in the particular direction, using the respective selected transmit power for each sub-band.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A method performed by a transmitting device for transmitting to a receiving device in a wireless communications network, the transmitting device comprising a plurality of antenna elements, the method comprising:
performing a directional carrier-sense assessment in a particular direction to decide whether to perform a subsequent Orthogonal Frequency Division Multiplex (OFDM) transmission in the particular direction for the receiving device, the directional carrier-sense assessment comprising sensing a level of wireless activity in the particular direction for each sub-band among two or more sub-bands that subdivide a full bandwidth associated with the OFDM transmission, each sub-band frequency-wise containing one or more subcarriers among a plurality of subcarriers used for the OFDM transmission and each sub-band detected as being an idle sub-band or a busy sub-band in dependence on the level of wireless activity sensed for the sub-band in the particular direction;
determining whether there is at least a threshold number of idle subcarriers, wherein each subcarrier in each sub-band is deemed idle or busy in dependence on whether the sub-band was detected as being idle or busy; and
responsive to determining that there is at least the threshold number of idle sub-carriers, performing the OFDM transmission in the particular direction, including selecting a respective transmit power for each sub-band in dependence on whether the sub-band was detected as being idle or busy.

2. The method according to claim 1, wherein the step of selecting the respective transmit power for each sub-band comprises selecting a zero transmit power for the subcarriers in the busy sub-bands and selecting a non-zero transmit power for the subcarriers in the idle sub-bands.

3. The method according to claim 1, further comprising deferring the OFDM transmission responsive to determining that there is not at least the threshold number of idle sub-carriers.

4. The method according to claim 1, wherein the threshold number of idle subcarriers is determined based on a total number of subcarriers across the full bandwidth and a coding rate.

5. The method according to claim 1, wherein the directional carrier-sense assessment comprises:
measuring a received power over each sub-band; and
comparing the received power for each sub-band to a threshold, to determine whether the sub-band is idle or busy.

6. The method according to claim 5, wherein the threshold is a reference threshold value for omni-directional carrier-sense assessment, and wherein the received power for each sub-band is adjusted by a first factor relating to directional antenna gain and a second factor to compensate for the received power being measured over the sub-band.

7. The method according to claim 1, wherein the directional carrier-sense assessment comprises applying a set of weights to signals received by the plurality of antennas to impart antenna gain in the particular direction, and wherein the set of weights is used for the OFDM transmission to impart antenna gain in the particular direction.

8. The method according to claim 1, wherein performing the directional carrier-sense assessment and determining whether to perform the OFDM transmission based on the directional carrier-sense assessment are conditional steps performed in response to an omni-directional carrier-sense assessment by the transmitting device indicating that one or more of the sub-bands are busy.

9. A transmitting device for transmitting to a receiving device in a wireless communications network, the transmitting device comprising a plurality of antenna elements and processing circuitry, the processing circuitry being configured to:
perform a directional carrier-sense assessment in a particular direction to decide whether to perform a subsequent Orthogonal Frequency Division Multiplex (OFDM) transmission in the particular direction for the receiving device, the directional carrier-sense assessment comprising sensing a level of wireless activity in the particular direction for each sub-band among two or more sub-bands that subdivide a full bandwidth associated with the OFDM transmission, each sub-band frequency-wise containing one or more subcarriers among a plurality of subcarriers used for the OFDM transmission and each sub-band detected as being an idle sub-band or a busy sub-band in dependence on the level of wireless activity sensed for the sub-band in the particular direction;
determine whether there is at least a threshold number of idle subcarriers, wherein each subcarrier in each sub-band is deemed idle or busy in dependence on whether the sub-band was detected as being idle or busy; and
responsive to determining that there is at least the threshold number of idle sub-carriers, perform the OFDM transmission in the particular direction, including selecting a respective transmit power for each sub-band in dependence on whether the sub-band was detected as being idle or busy.

10. The transmitting device according to claim 9, wherein the processing circuitry is configured to select the respective transmit power for each sub-band by selecting a zero transmit power for the subcarriers in the busy sub-bands and selecting a non-zero transmit power for the subcarriers in the idle sub-bands.

11. The transmitting device according to claim 9, wherein the processing circuitry is further configured to defer the OFDM transmission responsive to determining that there is not at least the threshold number of idle sub-carriers.

12. The transmitting device according to claim 9, wherein the threshold number of subcarriers is determined based on a total number of subcarriers across the full bandwidth and a coding rate.

13. The transmitting device according to claim 9, wherein the directional carrier-sense assessment comprises:
measuring a received power over each sub-band; and
comparing the received power for each sub-band to a threshold, to determine whether the sub-band is idle or busy.

14. The transmitting device according to claim 13, wherein the threshold is a reference threshold value for omni-directional carrier-sense assessment, and wherein the received power for each sub-band is adjusted by a first factor relating to directional antenna gain and a second factor to compensate for the received power being measured over the sub-band.

15. The transmitting device according to claim 9, wherein the directional carrier-sense assessment comprises one or more of an energy-detect algorithm and a signal-detect algorithm.

16. The transmitting device according to claim 9, wherein at least one of the sub-bands is not contiguous in the frequency domain with respect to at least one other one of the sub-bands.

17. The transmitting device according to claim 9, wherein the directional carrier-sense assessment comprises applying a set of weights to signals received by the plurality of antennas to impart antenna gain in the particular direction, and wherein the set of weights is used for the OFDM transmission to impart antenna gain in the particular direction.

18. The transmitting device according to claim 9, wherein the processing circuitry is further configured to perform the directional carrier-sense assessment and determine whether to perform the OFDM transmission based on the directional carrier-sense assessment as conditional steps performed in response to an omni-directional carrier-sense assessment by the transmitting device indicating that one or more of the sub-bands are busy perform an omni directional carrier sense assessment for the one or more sub bands.

19. A non-transitory device-readable non-transitory medium storing instructions which, when executed by processing circuitry of a transmitting device, the transmitting device further comprising a plurality of antenna elements, cause the processing circuitry to:
perform a directional carrier-sense assessment in a particular direction to decide whether to perform a subsequent Orthogonal Frequency Division Multiplex (OFDM) transmission in the particular direction for the receiving device, the directional carrier-sense assessment comprising sensing a level of wireless activity in the particular direction for each sub-band among two or more sub-bands that subdivide a full bandwidth associated with the OFDM transmission, each sub-band frequency-wise containing one or more subcarriers among a plurality of subcarriers used for the OFDM transmission and each sub-band detected as being an idle sub-band or a busy sub-band in dependence on the level of wireless activity sensed for the sub-band in the particular direction;
determine whether there is at least a threshold number of idle subcarriers, wherein each subcarrier in each sub-band is deemed idle or busy in dependence on whether the sub-band was detected as being idle or busy; and
responsive to determining that there is at least the threshold number of idle sub-carriers, perform the OFDM transmission in the particular direction, including selecting a respective transmit power for each sub-band in dependence on whether the sub-band was detected as being idle or busy.

* * * * *

UNITED STATES PATENT AND TRADEMARK OFFICE
CERTIFICATE OF CORRECTION

PATENT NO. : 11,690,027 B2
APPLICATION NO. : 17/287285
DATED : June 27, 2023
INVENTOR(S) : Sundman et al.

It is certified that error appears in the above-identified patent and that said Letters Patent is hereby corrected as shown below:

On the Title Page

In Item (56), under "OTHER PUBLICATIONS", in Column 2, Line 3, delete "Oct. 9-12," and insert -- Oct. 8-12, --, therefor.

In Item (57), under "ABSTRACT", in Column 2, Line 5, delete "a 10 wireless communications network." and insert -- a wireless communications network. --, therefor.

In Item (57), under "ABSTRACT", in Column 2, Line 12, delete "sub-15 bands" and insert -- sub-bands --, therefor.

On Page 2, in Item (56), under "OTHER PUBLICATIONS", in Column 1, Line 7, delete "Springer-Veriag" and insert -- Springer-Verlag --, therefor.

In the Drawings

In Fig. 2, Sheet 2 of 4, and on the Title Page, the illustrative print figure, for Step "214", in Line 1, delete "Transmit to" and insert -- Transmit data to --, therefor.

In the Specification

In Column 5, Line 18, delete "band, BW," and insert -- bandwidth, BW, --, therefor.

In Column 5, Line 19, delete "into/sub-bands (where/is" and insert -- into I sub-bands (where I is --, therefor.

In Column 5, Line 27, delete "bandwidth s" and insert -- bandwidth S --, therefor.

In Column 5, Line 38, delete "bandwidth s" and insert -- bandwidth S --, therefor.

Signed and Sealed this
Seventh Day of November, 2023

Katherine Kelly Vidal
*Director of the United States Patent and Trademark Office*

CERTIFICATE OF CORRECTION (continued)
U.S. Pat. No. 11,690,027 B2

In Column 6, Lines 7-8, delete "and a for" and insert -- and $P_s$ for --, therefor.

In Column 8, Line 15, delete "fora" and insert -- for a --, therefor.

In Column 9, Line 10, delete "such a" and insert -- such as a --, therefor.

In Column 9, Line 30, delete "(SOC)." and insert -- (SoC). --, therefor.

In Column 9, Line 38, delete "402. alternative" and insert -- 402. In alternative --, therefor.

In Column 10, Line 47, delete "such a" and insert -- such as a --, therefor.

In the Claims

In Column 13, Lines 30-31, in Claim 18, delete "busy perform an omni directional carrier sense assessment for the one or more sub bands." and insert -- busy. --, therefor.

In Column 14, Lines 9-10, in Claim 19, delete "the receiving device," and insert -- a receiving device, --, therefor.